United States Patent [19]
Fitch

[11] Patent Number: 5,700,528
[45] Date of Patent: Dec. 23, 1997

[54] HEAT RECOVERABLE ARTICLE

[75] Inventor: Anthony Ronald Leslie Fitch, Swindon, England

[73] Assignee: Raychem Limited, Swindon, United Kingdom

[21] Appl. No.: 492,059

[22] PCT Filed: Jan. 19, 1994

[86] PCT No.: PCT/GB94/00097

§ 371 Date: Jul. 19, 1995

§ 102(e) Date: Jul. 19, 1995

[87] PCT Pub. No.: WO94/16874

PCT Pub. Date: Aug. 4, 1994

[30] Foreign Application Priority Data

Jan. 21, 1993 [GB] United Kingdom ............... 9301110

[51] Int. Cl.⁶ .................. B65B 53/02; F16B 4/00; B29C 61/02

[52] U.S. Cl. ............... 428/34.9; 428/35.1; 428/36.9; 428/913; 285/381.4; 285/909; 264/230; 174/DIG. 8

[58] Field of Search .................. 428/35.1, 36.7, 428/36.8, 36.9, 36.92, 910, 34.9, 913, 220; 285/381.4, 381.5, 909; 156/84–86; 474/94, 161, 902; 264/230; 174/DIG. 8

[56] References Cited

U.S. PATENT DOCUMENTS

| | | | |
|---|---|---|---|
| 2,072,962 | 3/1937 | Plebanski | 250/11 |
| 3,086,242 | 4/1963 | Cook et al. | 18/1 |
| 3,597,372 | 8/1971 | Cook | 260/4 |
| 4,860,851 | 8/1989 | Krevor | 181/207 |
| 5,224,903 | 7/1993 | Langhof et al. | 474/161 |
| 5,340,167 | 8/1994 | Morse | 285/909 |
| 5,360,378 | 11/1994 | Susuki et al. | 474/161 |

FOREIGN PATENT DOCUMENTS

| | | |
|---|---|---|
| 0519163 | 12/1992 | European Pat. Off. . |
| A61-162321 | 7/1986 | Japan . |
| A423382 | 4/1967 | Switzerland . |
| WO 93/17272 | 2/1993 | WIPO . |

*Primary Examiner*—Rena Dye
*Attorney, Agent, or Firm*—Herbert G. Burkard; Sheri M. Novack

[57] ABSTRACT

A resiliently flexible ring of dimensionally heat-recoverable polymeric material whose tubular length is less than its notional circular diameter, formed so that it inherently maintains a non-circular open configuration enabling it to grip resiliently an object around which it is placed in use prior to heat-recovery, the maximum transverse dimension of the said object being at least 2.5% less, preferably at least 5% less, than the notional circular diameter of the ring. The ring preferably has at least three "corners" of relatively small radius of curvature, preferably evenly spaced around its circumference. Use of the rings is described for damping the noise of chain-drive sprocket wheels and for connecting flexible hoses to supply outlets.

11 Claims, 1 Drawing Sheet

HEAT RECOVERABLE ARTICLE

This invention relates to dimensionally heat-recoverable polymeric articles, such articles made, for example, of cross-linked polyolefin plastics, being generally well known. Methods and materials for making such articles have been described, for example, in U.S. Pat. Nos. 3,086,242 and 3,597,372.

SUMMARY OF THE INVENTION

The present invention provides a special form of such article, which is particularly convenient to use in certain situations. The invention accordingly provides a resiliently flexible ring of dimensionally heat-recoverable polymeric material formed so that it inherently maintains a non-circular open configuration enabling it to grip resiliently an object around which it is placed in use prior to heat-recovery, the maximum transverse dimension of the said object being at least 2.5% less, preferably at least 5% less, than the notional circular diameter of the ring.

References herein to a "ring" will be understood to mean open-ended tubular articles whose length is less than their notional circular diameter (the length of their perimeter divided by pi). The invention is especially advantageous with rings whose length is less than half, or less than one quarter, or less than one eighth, of their notional circular diameter.

By providing such a ring in non-circular open configuration, the invention ingeniously enables the ring to grip a circular object, about which such rings may be fitted, prior to heat recovery to shrink the ring tightly onto the object. The open configuration enables the ring to be fitted onto the object without difficulty, unlike a flattened tubular configuration which would be difficult to hold open during fitting. However, the resilient grip provided by the non-circular configuration according to the present invention reduces the irritating problem of the ring falling off the object between the initial fitting and the heat-recovery operation. This problem is more severe with axially shorter rings especially those whose tubular or axial length is less than one eighth of their notional circular diameter, when applying them close to the end of objects such as shafts or hoses. One particularly relevant case is that in which the length of an object available to receive a short ring is little greater than, or equal to, the short tubular length of the ring.

The non-circular open configuration of the ring according to this invention could be simply eliptical having two equal "ends" of relatively small radius of curvature, or possibly pear-shaped having one smaller and one larger "end". However, it is preferred to provide the ring with at least three "corners" of relatively small radius of curvature (relative to the notional circular diameter), preferably evenly spaced around its circumference. The longer portions of the ring extending between these corners may be curved with a larger radius than the corners, or may be substantially straight, giving the ring a triangular, square, pentagonal, or hexagonal configuration, depending on the number of corners provided. It will be realised that the usefulness of the gripping effect will diminish as the number of corners increases beyond about six, and it is thought that fewer than ten, preferably fewer than eight, corners will be desirable in most cases. Three or four corners, most preferably three, will tend to give a more positive grip for locating the ring on a round object. The radius of curvature of the "corners" will preferably be less than ¼, more preferably less than one eighth, and especially preferably less than one tenth or less than one twentieth, of the notional circular diameter of the ring. Sharp-pointed corners are not excluded, but are likely to be less convenient in practice. Rounded corners are preferred.

The rings according to the invention may be made by known techniques, for example by individual moulding, or by extrusion of a tube which is cut to length. The non-circular open configuration will preferably be imparted after the moulding or extrusion of a substantially circular shape, for example during the usual hot expansion process which is used to convert the article into its heat-recoverable expanded state. Stretching on an array of mutually separable circular pins will produce one "corner" per pin, with the radius of curvature determined by the radius of the pins.

Suitably non-brittle materials for making the rings may be selected from those known for making heat-recoverable articles, provided that an adequate degree of resilient flexibility is present. With that proviso, any polymeric material which can be cross-linked and to which the property of dimensional recoverability may be imparted, such as those disclosed in U.S. Pat. No. 3,086,242, may be used to form the rings. Preferred materials include: polyolefins, e.g. low, medium or high density polyethylene; polypropylene; ethylene copolymers, e.g. with alpha olefins such as propylene, 1-butene, 1-hexene or 1-octene, or vinyl acetate or other vinyl esters or methyl or ethyl acrylate; polyamides, especially Nylon materials, e.g. Nylon 6, Nylon 6,6, Nylon 11 or Nylon 12 or those disclosed in U.S. Pat. No. 4,444,816; or polyurethanes. The disclosures of the above patent specifications are incorporated herein by reference. Materials which are at least to some extent elastomeric may be preferable for some end uses. The material is preferably cross-linked in known manner by chemical cross-linking agents and/or by exposure to high energy radiation.

Preferred materials, especially for accoustic damping applications, are described in U.S. Pat. No. 4,860,851, the disclosure of which is incorporated herein by reference.

The invention also provides a method of applying a ring of heat-recoverable material to an object, comprising positioning on the object a ring according to the present invention of such a size that it resiliently grips the object, followed by heating to recover the ring tightly onto the object. The object will have a maximum transverse dimension (i.e. transverse to the tubular axis of the ring) at least 2.5%, preferably at least 5%, less than the notional circular diameter of the ring. Preferably the ring will be large enough to enable it to be easily flexed and slipped onto the object, after which its resilience will cause it to grip the object at at least two points of contact therewith while awaiting heat recovery to shrink it tightly onto the object. Before recovery the ring will not touch the object at all points of its perimeter, preferably touching it at fewer than ten points over a total contact length less than half, or less than ¼, or less than ⅒ of the ring perimeter. The object is preferably substantially round in cross-section, for example a round shaft or pin or projection, or a hose and its diameter is less than the notional circular diameter as aforesaid.

The invention is especially useful in a method of drive chain noise damping wherein the said object to which the ring is applied is a portion of a chain sprocket wheel projecting to the side of the plane of rotation of the sprocket teeth, and the ring is of sufficient thickness and resilience to damp the chain noise.

The invention is also especially useful in applying the recoverable rings at or near the ends of flexible hoses, for example vehicle heating hoses or domestic appliance hoses, in order to secure the hoses to co-operating fittings during assembly. The invention includes laterally connected sets of two or more of the rings, for example for the purpose of securing together two or more hoses or other objects. The lateral connection is preferably formed by a web of the ring material.

DESCRIPTION OF THE DRAWINGS

The aforementioned chain-drive-damping embodiment of the invention will now be described in more detail by way of example, with reference to the accompanying schematic drawings, wherein.

Figure 1:
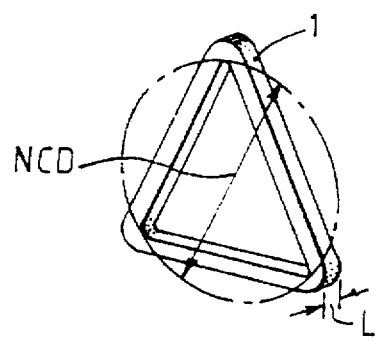
FIG. 1 shows in perspective a three-cornered ring of dimensionally heat-recoverable material according to the present invention.

Referring to the drawings, the three-cornered ring 1 shown in FIG. 1 is made of hydrogenated nitrile rubber, carbon black and a polyester elastomer as described in the aforementioned U.S. Pat. No. 4,860,851, and has a tubular length L which is less than ⅛ of its notional circular diameter indicated by line NCD.

Figure 2:
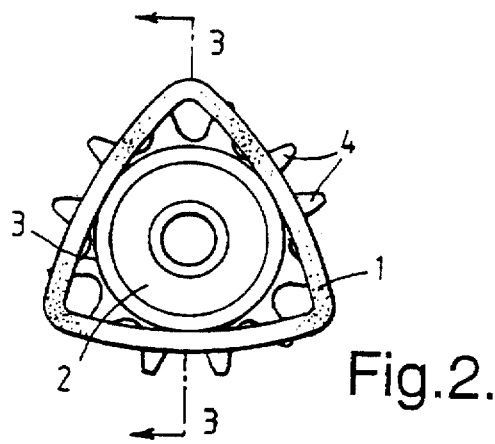
FIG. 2 shows a side view of a chain drive sprocket wheel with the ring of FIG. 1 gently gripping a circular projecting portion of the sprocket wheel before heat recovery.
Figure 3:
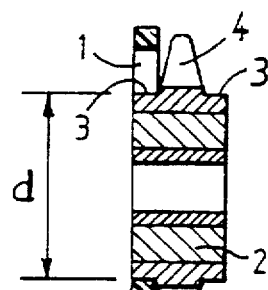
FIG. 3 shows as end view in section on the lines 3—3 of FIG. 2.

In FIGS. 2 and 3, the ring 1 has been positioned on laterally projecting circular portion 3 of a sprocket wheel 2 immediately adjacent to the sprocket teeth 4. The diameter d of the projecting portion 3 is about ⅓ less than the NCD of ring 1, which is therefore easily flexed and slipped over the portion 3. The ring 1 thereafter gently grips the portion 3 by contact at about the mid-point of its three sides, the size of the ring naturally having been selected to achieve this effect.

Figure 4:
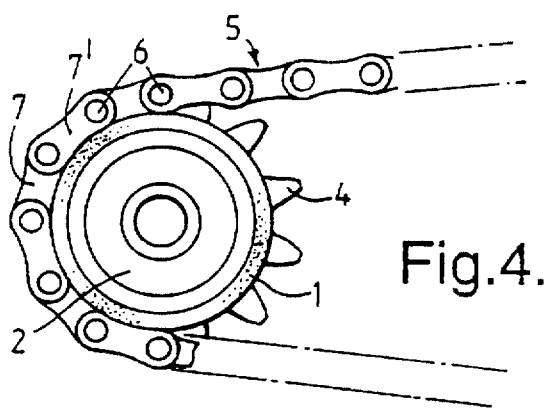
FIGS. 4 and 5 show the arrangement of FIGS. 2 and 3 respectively after heat recovery of two rings onto the sprocket wheel and engagement of a drive chain around the wheel.
Figure 5:
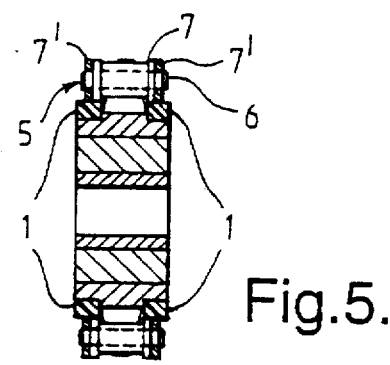

After recovery of two rings 1 onto the projecting sprocket wheel portions 3, as shown in FIGS. 4 and 5, a drive chain 5 may be engaged with the sprocket teeth 4. As shown most clearly in partial cross-section in FIG. 5, the chain 5 has connecting pins 6 flexibly joining links 7 and 7', parts of which link 7 come into contact with the outer surface of the shrunk rings 1, thereby damping the chain noise. The rings thus provide a very convenient replacement for known moulded-on rubber damping structures.

Figure 6:
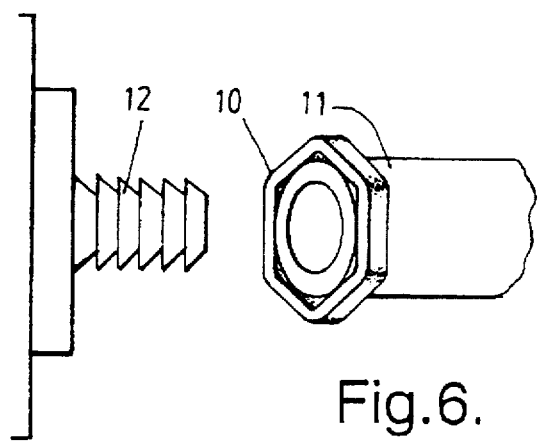
Figure 7:
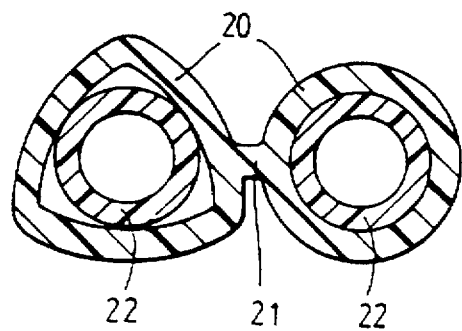

The use of the rings on flexible hoses will now be described by way of examples with reference to FIGS. 6 and 7 of the accompanying schematic drawings, wherein:

FIG. 6 shows in perspective a hexagonal ring in position near the end of a hose prior to fitting of the hose into a supply spigot; and FIG. 7 shows in cross-section a joined pair of rings positioned on the ends of a pair of hoses.

In FIG. 6, the ring 10 has been expanded with six "corners" and resiliently grips the hose 11 near its end. The hose can be fitted over the supply spigot 12 (or other member insertable into the hose), e.g. a water valve outlet, and the ring 10 can then be recovered by heating to clamp the hose 11 to the spigot 12.

In FIG. 7, the two rings 20 are joined together laterally (that is by their outer surfaces) by a web 21 and are shown in position on a pair of hoses 22. The ring shown on the right has been heat recovered about its hose, while the ring shown on the left is resiliently gripping its hose prior to being recovered.

We claim:

1. A hose coupling article comprising a resiliently flexible ring of dimensionally heat recoverable polymeric material whose tubular length is less than its notional circular diameter, formed so that it inherently maintains a non-circular open configuration enabling it to grip resiliently an object around which it is placed in use prior to heat recovery, the maximum transverse dimension of the said object being at least 2.5% less than the notional circular diameter of the ring and the ring being laterally connected to at least one other such ring so that the connected rings are capable of securing together at least two flexible hoses.

2. An article according to claim 1, whose tubular length is less than half of its notional circular diameter.

3. An article according to claim 2, whose length is less than one quarter of its notional circular diameter.

4. An article according to claim 2, whose length is less than one eighth of its notional circular diameter.

5. An article according to claim 1, whose configuration is elliptical.

6. An article according to claim 1, whose configuration is pear-shaped.

7. An article according to claim 1, having at least three corners whose radius of curvature is less than one quarter of the said notional circular diameter.

8. An article according to claim 7, having from four to six such corners.

9. An article according to claim 7, having three such corners.

10. A method of securing together two or more flexible hoses, comprising positioning the laterally connected rings according to claim 1 respectively onto the separate hoses, followed by heat recovery of the rings tightly onto the hoses.

11. A method according to claim 10, wherein the hoses are substantially round in cross-section and their diameter is at least 2.5% less than the said notional circular diameter of the rings.

* * * * *